(12) United States Patent
Shi et al.

(10) Patent No.: US 12,041,554 B2
(45) Date of Patent: Jul. 16, 2024

(54) METHOD FOR INFORMATION PROCESSING AND TERMINAL DEVICE

(71) Applicant: GUANGDONG OPPO MOBILE TELECOMMUNICATIONS CORP., LTD., Guangdong (CN)

(72) Inventors: Zhihua Shi, Guangdong (CN); Wenhong Chen, Guangdong (CN); Yun Fang, Guangdong (CN); Yingpei Huang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 269 days.

(21) Appl. No.: 17/369,284

(22) Filed: Jul. 7, 2021

(65) Prior Publication Data

US 2021/0337483 A1    Oct. 28, 2021

Related U.S. Application Data

(63) Continuation of application No. PCT/CN2019/071454, filed on Jan. 11, 2019.

(51) Int. Cl.
  *H04W 52/18*    (2009.01)
  *H04W 24/10*    (2009.01)

(52) U.S. Cl.
  CPC .......... *H04W 52/18* (2013.01); *H04W 24/10* (2013.01)

(58) Field of Classification Search
  CPC .................. H04W 52/18; H04W 24/10
  See application file for complete search history.

(56) References Cited

U.S. PATENT DOCUMENTS

| | | | | |
|---|---|---|---|---|
| 2007/0149238 | A1* | 6/2007 | Das | H04W 52/40 455/69 |
| 2013/0230027 | A1* | 9/2013 | Das | H04W 52/16 370/336 |
| 2018/0115957 | A1* | 4/2018 | Lin | H04W 52/365 |
| 2018/0324715 | A1* | 11/2018 | Ryoo | H04L 27/2646 |
| 2020/0037269 | A1* | 1/2020 | Ryu | H04B 7/063 |

FOREIGN PATENT DOCUMENTS

| | | |
|---|---|---|
| CN | 102083129 | 6/2011 |
| CN | 102300249 | 12/2011 |
| CN | 102547954 | 7/2012 |
| CN | 108112065 | 6/2018 |
| CN | 108632891 | 10/2018 |
| CN | 109089279 | 12/2018 |
| WO | 2011134351 | 11/2011 |

OTHER PUBLICATIONS

WIPO, International Search Report for PCT/CN2019/071454, dated Oct. 11, 2019.

(Continued)

*Primary Examiner* — Junpeng Chen
(74) *Attorney, Agent, or Firm* — Hodgson Russ LLP

(57) ABSTRACT

A method for information processing and a terminal device are provided. The method includes the following. A terminal device sends to a network device power back-off information corresponding to at least one transmit beam or reference signal resource.

17 Claims, 9 Drawing Sheets

(56) References Cited

OTHER PUBLICATIONS

EPO, Extended European Search Report issued for EP Application No. 19908844.4, Nov. 24, 2021.
Oppo, 3GPP TSG-RAN WG4 Meeting #89, R4-1814957, "Discussion on UE RF Exposure Compliance in FR2", 7.6.6.1.2, Nov. 2018.
Nokia, 3GPP TSG RAN WG1, Meeting #95, R1-1813490, "Enhancements on Multi-Beam Operation", 7.2.8.3, Nov. 12, 2018.
3GPP Organizational Partners, 3GPP TS 36.321, V15.3.0, 3rd Generation Partnership Project, Technical Specification Group Radio Access Network, Evolved Universal Terrestrial Radio Access (E-UTRA), Medium Access Control (MAC) Protocol Specification, Release 15, Sep. 2018.
EPO, Communication for EP Application No. 19908844.4, Feb. 19, 2024.
Nokia et al., "Correction on power backoff indication due to Power management," 3GPP TSG-RAN WG2 Meeting #104, R2-1818042, Nov. 2018.
CNIPA, First Office Action for CN Application No. 202211537231. 7, May 18, 2024.

\* cited by examiner

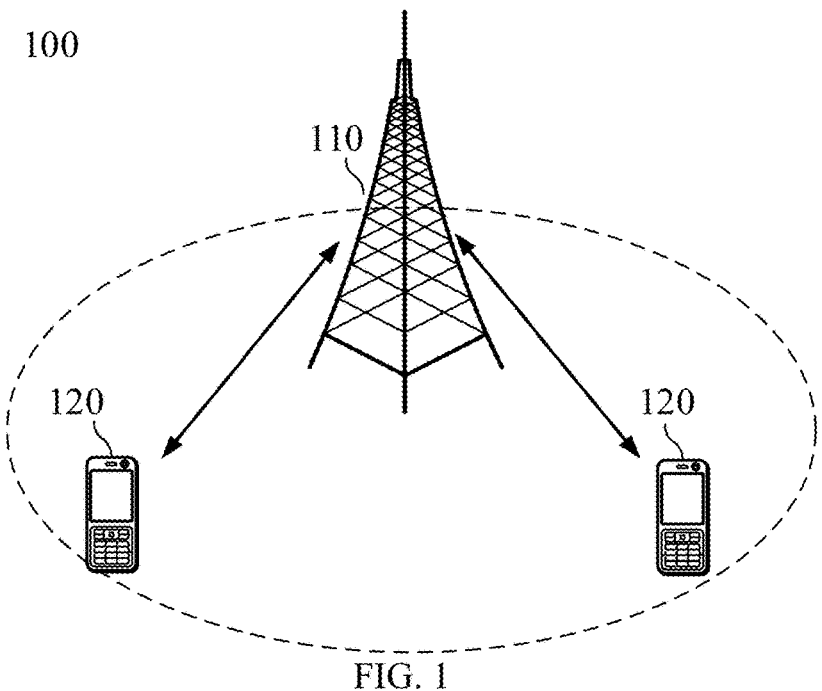
FIG. 1
200
A TERMINAL DEVICE SENDS TO A NETWORK DEVICE POWER BACK-OFF INFORMATION CORRESPONDING TO AT LEAST ONE TRANSMIT BEAM OR REFERENCE SIGNAL RESOURCE  — 210
FIG. 2
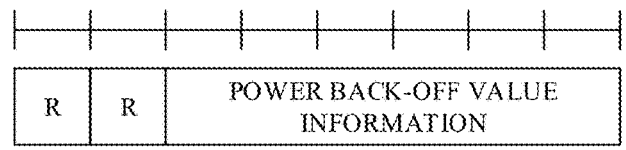
FIG. 3A
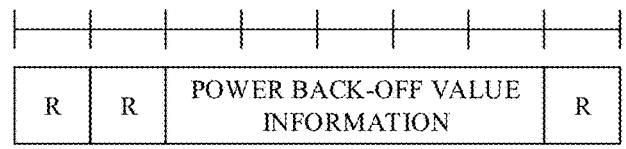
FIG. 3B

| | | |
|---|---|---|
| R | R | PH (TYPE 1, PRIMARY CELL (PCELL)) |
| R | R | $P_{CMAX,f,c}$ |

FIG. 3U

| $C_7$ | $C_6$ | $C_5$ | $C_4$ | $C_3$ | $C_2$ | $C_1$ | R |
|---|---|---|---|---|---|---|---|
| P | V | PH (TYPE 2, SPECIAL CELL (SPCELL) OF THE OTHER MAC ENTITY) | | | | | |
| R | R | $P_{CMAX,f,c}$ 1 | | | | | |
| P | V | PH (TYPE 1, PCELL) | | | | | |
| R | R | $P_{CMAX,f,c}$ 2 | | | | | |
| P | V | PH (TYPE X, SERVING CELL 1) | | | | | |
| R | R | $P_{CMAX,f,c}$ 3 | | | | | |

...

| P | V | PH (TYPE X, SERVING CELL n) |
|---|---|---|
| R | R | $P_{CMAX,f,c}$ m |

FIG. 3V

| X | R | PH (TYPE 1, PCELL) |
|---|---|---|
| R | R | $P_{CMAX,f,c}$ |

FIG. 3W

| X | X | PH (TYPE 1, PCELL) |
|---|---|---|
| R | R | $P_{CMAX,f,c}$ |

FIG. 3X

| R | R | PH (TYPE 1, PCELL) |
|---|---|---|
| R | R | $P_{CMAX,f,c}$ |
| R | R | POWER BACK-OFF VALUE INFORMATION |

FIG. 3Y

| $C_7$ | $C_6$ | $C_5$ | $C_4$ | $C_3$ | $C_2$ | $C_1$ | X |
|---|---|---|---|---|---|---|---|
| P | V | PH (TYPE 2, SPCELL OF THE OTHER MAC ENTITY) | | | | | |
| R | R | $P_{CMAX,f,c}$ 1 | | | | | |
| P | V | PH (TYPE 1, PCELL) | | | | | |
| R | R | $P_{CMAX,f,c}$ 2 | | | | | |
| P | V | PH (TYPE X, SERVING CELL 1) | | | | | |
| R | R | $P_{CMAX,f,c}$ 3 | | | | | |
| ... | | | | | | | |
| P | V | PH (TYPE X, SERVING CELL n) | | | | | |
| R | R | $P_{CMAX,f,c}$ m | | | | | |

FIG. 3Z

| $C_7$ | $C_6$ | $C_5$ | $C_4$ | $C_3$ | $C_2$ | $C_1$ | R |
|---|---|---|---|---|---|---|---|
| P | V | \multicolumn{6}{c}{PH (TYPE 2, SPCELL OF THE OTHER MAC ENTITY)} |
| X | X | \multicolumn{6}{c}{$P_{CMAX,f,c}$ 1} |
| P | V | \multicolumn{6}{c}{PH (TYPE 1, PCELL)} |
| R | R | \multicolumn{6}{c}{$P_{CMAX,f,c}$ 2} |
| P | V | \multicolumn{6}{c}{PH (TYPE X, SERVING CELL 1)} |
| R | R | \multicolumn{6}{c}{$P_{CMAX,f,c}$ 3} |

...

| P | V | PH (TYPE X, SERVING CELL n) |
|---|---|---|
| R | R | $P_{CMAX,f,c}$ m |

FIG. 3AA

| $C_7$ | $C_6$ | $C_5$ | $C_4$ | $C_3$ | $C_2$ | $C_1$ | R |
|---|---|---|---|---|---|---|---|
| P | V | \multicolumn{6}{c}{PH (TYPE 2, SPCELL OF THE OTHER MAC ENTITY)} |
| X | X | \multicolumn{6}{c}{$P_{CMAX,f,c}$ 1} |
| P | V | \multicolumn{6}{c}{PH (TYPE 1, PCELL)} |
| R | R | \multicolumn{6}{c}{$P_{CMAX,f,c}$ 2} |
| P | V | \multicolumn{6}{c}{PH (TYPE X, SERVING CELL 1)} |
| R | R | \multicolumn{6}{c}{$P_{CMAX,f,c}$ 3} |

...

| P | V | PH (TYPE X, SERVING CELL n) |
|---|---|---|
| R | R | $P_{CMAX,f,c}$ m |

FIG. 3AB

METHOD FOR INFORMATION PROCESSING AND TERMINAL DEVICE

CROSS REFERENCE TO RELATED APPLICATION(S)

This application is a continuation of International Application No. PCT/CN2019/071454, filed on Jan. 11, 2019, the entire disclosure of which is incorporated herein by reference.

TECHNICAL FIELD

This disclosure relates to the field of communication technology, and more particularly to a method for information processing and a terminal device.

BACKGROUND

In a new radio (NR) system, terminal devices can use multiple beams for uplink transmission. When the terminal device is close to a human body, a transmission power or effective isotropic radiated power (EIRP) may exceed a specified safety value. In this situation, in order to ensure safety of the human body, the terminal device can perform power back-off on one or more transmit beams, that is, to reduce the transmission power of the terminal device.

Since the transmit beam is directional, there will be a different positional relationship between each transmit beam and the human body. If the transmission power or EIRP of the terminal device exceeds the specified safety value, the terminal device can determine a power back-off value of each transmit beam according to the positional relationship between the transmit beam and the human body. For example, if a transmit beam is aligned with the human body, power back-off is required. If a transmit beam is not aligned with the human body, there is no need to perform power back-off, or the power back-off value needs to be decreased during power back-off.

However, since the power back-off value of each transmit beam may be different, which may affect uplink transmission performance of the terminal device, there is a need to provide a method to achieve reliable uplink transmission of multiple transmit beams.

SUMMARY

In a first aspect, a method for information processing is provided. The method includes the following. A terminal device sends to a network device power back-off information corresponding to at least one transmit beam or reference signal resource.

In a second aspect, a terminal device is provided. The terminal device includes a transceiver, at least one processor and a memory. The memory is configured to store computer programs. The processor is configured invoke and execute the computer programs stored in the memory, to make the transceiver perform the method described in the first aspect or in other implementations.

BRIEF DESCRIPTION OF THE DRAWINGS

In order to describe technical solutions of implementations more clearly, the following will give a brief introduction to the accompanying drawings used for describing implementations or the related art. Apparently, the accompanying drawings hereinafter described are some implementations of the disclosure. Based on these drawings, those of ordinary skill in the art can also obtain other drawings without creative effort.

FIG. 1 is a schematic architectural diagram of a communication system according to implementations.

FIG. 2 is a schematic diagram of a method for information processing according to implementations.

DETAILED DESCRIPTION

Figure 3C:
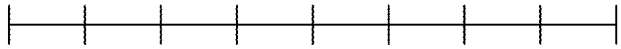
FIG. 3A to FIG. 3AB are schematic diagrams of higher-layer signaling corresponding to implementations illustrated in FIG. 2.

The following will describe technical solutions of implementations with reference to the accompanying drawings. Apparently, implementations described herein are merely some implementations, rather than all implementations, of the disclosure. Based on the implementations described herein, all other implementations obtained by those of ordinary skill in the art without creative effort shall fall within the protection scope of the disclosure.

The technical solutions of implementations are applicable to various communication systems, for example, a global system of mobile communication (GSM), a code division multiple access (CDMA) system, a wideband code division multiple access (WCDMA) system, a general packet radio service (GPRS) system, a long term evolution (LTE) system, an LTE frequency division duplex (LTE-FDD) system, an LTE time division duplex (LTE-TDD) system, a universal mobile telecommunication system (UMTS), a worldwide interoperability for microwave access (WiMAX) communication system, or a $5^{th}$ generation (5G) system.

FIG. 1 illustrates a communication system 100 of implementations. The communication system 100 may include a network device 110. The network device 110 may be a device that communicates with a terminal device 120 (also referred to as a communication terminal device or a terminal). The network device 110 can provide a communication coverage for a specific geographical area and communicate with terminal devices in the coverage area. The network device 110 may be a base transceiver station (BTS) in the GSM or in the CDMA system, or may be a NodeB (NB) in the WCDMA system, or may be an evolutional Node B (eNB or eNodeB) in the LTE system, or a radio controller in a cloud radio access network (CRAN). Alternatively, the network device may be a mobile switching center, a relay station, an access point, an in-vehicle device, a wearable device, a hub, a switch, a bridge, a router, a network-side device in a 5G network, or a network device in a future evolved public land mobile network (PLMN).

The communication system 100 further includes at least one terminal device 120 in a coverage area of the network device 110. The "terminal device" referred to herein can include but is not limited to a device configured to communicate via a wired line, another data connection/network, a wireless interface, a device which is part of another terminal device and configured to receive/transmit communication signals, and/or an Internet of things (IoT) device. Examples of the wired line may include, but are not limited to, a public switched telephone network (PSTN), a digital subscriber line (DSL), a digital cable, and a direct connection cable.

Examples of the wireless interface may include, but are not limited to, a wireless interface for a cellular network, a wireless local area network (WLAN), a digital television network (such as a digital video broadcasting-handheld (DVB-H) network), a satellite network, and an amplitude modulation-frequency modulation (AM-FM) broadcast transmitter. A terminal device configured to communicate via a wireless interface may be called a "wireless communication terminal", a "wireless terminal", or a "mobile terminal". Examples of a mobile terminal may include, but are not limited to, a satellite telephone or cellular telephone, a personal communication system (PCS) terminal integrated with functions of cellular radio telephone, data processing, fax, and/or data communication, a personal digital assistant (PDA) equipped with radio telephone, pager, Internet/Intranet access, web browsing, notebook, calendar, and/or global positioning system (GPS) receiver, and/or a conventional laptop, a handheld receiver, or other electronic devices equipped with radio telephone receiver. The terminal device may refer to an access terminal, a user equipment (UE), a subscriber unit, a subscriber station, a mobile station, a remote station, a remote terminal, a mobile device, a user terminal, a terminal, a wireless communication device, a user agent, or a user device. The access terminal may be a cellular radio telephone, a cordless telephone, a session initiation protocol (SIP) telephone, a wireless local loop (WLL) station, a PDA, a handheld device with wireless communication functions, a computing device, other processing devices coupled with a wireless modem, an in-vehicle device, a wearable device, a terminal device in the 5G network, a terminal device in the future evolved PLMN, etc.

As an example, terminal devices 120 can communicate with each other through device to device (D2D) communication.

As an example, the 5G system or 5G network can also be referred to as an NR system or NR network.

FIG. 1 exemplarily illustrates one network device and two terminal devices. The communication system 100 may also include multiple network devices, and there can be other numbers of terminal devices in a coverage area of each of the network devices, which is not limited herein.

The communication system 100 may further include other network entities such as a network controller, a mobile management entity, or the like, and the disclosure is not limited in this regard.

According to implementations, a device with communication functions in a network/system can be referred to as a "communication device". Taking the communication system 100 illustrated in FIG. 1 as an example, the communication device may include the network device 110 and the terminal device(s) 120 that have communication functions. The network device 110 and the terminal device(s) 120 can be the devices described above and will not be repeated herein. The communication device may further include other devices such as a network controller, a mobile management entity, or other network entities in the communication system 100, and the disclosure is not limited in this regard.

It should be understood that, the terms "system" and "network" herein are usually used interchangeably throughout this disclosure. The term "and/or" herein only describes an association relationship between associated objects, which means that there can be three relationships. For example, A and/or B can mean A alone, both A and B exist, and B alone. In addition, the character "/" herein, unless otherwise specified, generally indicates that the associated objects are in an "or" relationship.

According to regulations of various countries/regions/industry organizations, for the sake of human safety, a transmission power of the terminal device needs to be controlled to be within a specified safety range. Therefore, a safety value of the transmission power or effective isotropic radiated power (EIRP) is set, to limit the transmission power of the terminal device.

When the terminal device is close to a human body, the transmission power or EIRP may exceed a specified safety value. Since a transmit beam is directional, there will be a different positional relationship between each transmit beam and the human body. If the transmission power or EIRP of the terminal device exceeds the specified safety value, the terminal device can determine a power back-off value of each transmit beam according to the positional relationship between the transmit beam and the human body. For example, if some transmit beam is aligned with the human body, power back-off is required. If no transmit beam is aligned with the human body, there is no need to perform power back-off, or the power back-off value needs to be decreased during power back-off.

If power back-off is performed based on whether a transmit beam or transmit beam group is aligned with the human body as described above, an existing beam management mechanism may cause performance degradation, which will be explained with some examples below.

For example, the network device configures an aperiodic sounding reference signal (SRS) for the terminal device, selects a transmit beam for the terminal device as an uplink transmit beam based on the aperiodic SRS, and notifies the terminal device to use the selected transmit beam for uplink transmission. If the terminal device has been moved or rotated and a transmit beam currently working is aligned with the human body, and thus power back-off is required, an actual transmission power of the transmit beam currently working will be low. As a result, there may be another transmit beam that has a higher transmission efficiency. In this scenario, the transmit beam currently working is not an optimal choice. However, the network device may be unable to be promptly informed of this situation and thus will fail to reselect an uplink transmit beam.

For another example, a transmit beam for the terminal device is determined as the uplink transmit beam according to an optimal or relatively optimal downlink transmit beam. If the transmit beam is aligned with the human body and power back-off is required, an actual transmission power of the transmit beam currently working will be low. As a result, there may be another transmit beam that has a higher transmission efficiency. In this scenario, the transmit beam current working is not an optimal choice. However, the network device may be unable to be promptly informed of this situation and thus will fail to reselect an uplink transmit beam.

To this end, the main concept of the technical solutions provided herein is to make the terminal device perform information reporting, to assist or suggest the network device to implement a transmit-beam management operation, such as transmit-beam selection, transmit-beam indication, etc. In this way, the network device can quickly obtain information and perform an operation or instruction in time, thereby realizing reliable uplink transmission of multiple transmit beams.

FIG. 2 is a schematic diagram of a method 200 for information processing according to implementations.

At block 210, a terminal device sends to a network device power back-off information corresponding to at least one transmit beam or reference signal resource.

The term "beam" referred to herein is a term used in discussions and manuscripts, but it is usually not present in actual communication protocols, and it can be identified or indicated through a reference signal resource carried thereon or a reference signal resource corresponding thereto. For the convenience of description, "reference signal resource" is sometimes abbreviated as "signal resource".

For example, different synchronization signal blocks (SSB) (that is, SS/physical broadcast channel (PBCH) blocks) are transmitted on different beams. The terminal device can identify different downlink transmit beams through different SS/PBCH blocks.

A primary synchronization signal (PSS), a secondary synchronization signal (SSS), and a PBCH constitute an SSB, that is, SS/PBCH block.

For another example, signals corresponding to different channel state information reference signal (CSI-RS) resources are transmitted on different beams. The terminal device can identify different downlink transmit beams through different CSI-RS/CSI-RS resources.

For another example, signals corresponding to different SRS resources are transmitted on different beams. The network device can identify different uplink transmit beams through SRS/SRS resources.

For another example, there is beam correspondence, that is, if receive beam X is a relatively optimal/optimal choice for receiving a downlink signal, the terminal device determines, according to receive beam X, that transmit beam Y corresponding to receive beam X is a relatively optimal/optimal uplink transmit beam. If the network device indicates that a downlink signal corresponding to a downlink transmit beam is A, the terminal device can determine, according to receive beam B corresponding to downlink signal A received, transmit beam C corresponding to receive beam B. Therefore, besides directly indicating uplink transmit beam C of the terminal device, the network device can indirectly indicate uplink transmit beam C by indicating downlink signal A.

Therefore, in some implementations, the transmit beam for the terminal device may correspond to at least one of an SRS/SRS resource, an SSB, and a CSI-RS/CSI-RS resource, and the disclosure is not limited in this regard.

The network device can indicate a transmit beam by indicating at least one of the following signal identifiers corresponding to the transmit beam: an SRS resource indicator (SRI), an SSB index; and CSI-RS resource indicator.

In addition to the SRI, some signaling may further include indication information corresponding to an uplink bandwidth part (BWP) identifier (BWP ID) of an uplink BWP of the SRS resource.

In some implementations, the reference signal resource can include, but is not limited to, at least one of an SRS/SRS resource, an SSB, and a CSI-RS/CSI-RS resource, and the disclosure is not limited in this regard.

According to implementations herein, for a scenario in which the terminal device uses multiple transmit beams, the terminal device can determine whether to perform power back-off on each of the transmit beams, according to factors such as whether the transmit beam is close to the human body. If there are one or more transmit beams on which power back-off is required, for each of the one or more transmit beams, the terminal device can determine a power back-off value of power back-off corresponding to the transmit beam, and perform operations related to a transmission power of the transmit beam according to the power back-off value.

In some implementations, at block 210, the terminal device can send, according to a related condition, to the network device the power back-off information corresponding to at least one transmit beam or reference signal resource.

When a constraint on a power back-off value is satisfied, the terminal device can send to the network device the power back-off information corresponding to at least one transmit beam or reference signal resource. As such, the terminal device will perform information reporting only when the constraint on a power back-off value is satisfied, which is possible to effectively reduce resource demand on an uplink channel, thereby saving uplink resources, and on the other hand, reduce uplink interference in a system.

In some implementations, the constraint on a power back-off value may include, but is not limited to, at least one of the following: there is one transmit beam or reference signal resource or one transmit beam group or reference signal resource group which has a power back-off value greater than or equal to a first threshold value; and there are two transmit beams or reference signal resources or two transmit beam groups or reference signal resource groups which have a difference or ratio in power back-off values that is greater than or equal to a second threshold value.

The difference may refer to a difference between power back-off values in a dB (decibel) domain. The ratio may refer to a ratio between linear power back-off values.

In addition, the difference refers to an absolute value.

In some implementations, the first threshold value is specified in a protocol, determined by the terminal device, or indicated by the network device, which is not limited herein.

In some implementations, the first threshold value is indicated by the network device. The terminal device receives at least one of the following messages which are sent by the network device and indicative of the first threshold value: a system broadcast message, radio resource control (RRC) signaling, media access control (MAC) control element (CE) signaling, and downlink control information (DCI).

In some implementations, the second threshold value is specified in a protocol, determined by the terminal device, or indicated by the network device, which is not limited herein.

In some implementations, the second threshold value is indicated by the network device. The terminal device receives at least one of the following messages which are sent by the network device and indicative of the second threshold value: a system broadcast message, RRC signaling, MAC CE signaling, and DCI.

In other implementations, when a report condition on a power status report is satisfied, the terminal device sends to the network device the power back-off information corresponding to at least one transmit beam or reference signal resource.

In some implementations, the power status report includes, but is not limited to, a power headroom report (PHR), and the disclosure is not limited in this regard.

In other implementations, the terminal device sends, according to configuration information, to the network device the power back-off information corresponding to at least one transmit beam or reference signal resource.

For example, the configuration information may be periodically reported, semi-persistently reported, or aperiodically reported.

The configuration information may be specified in a protocol, determined by the terminal device, or indicated by the network device, and the disclosure is not limited in this regard.

In some implementations, the power back-off information corresponding to at least one transmit beam or reference signal resource may include, but is not limited to, at least one of: report indication, power back-off value information, and indication information of at least one transmit beam or reference signal resource.

In some implementations, the power back-off value information may include, but is not limited to, at least one of the following: a power back-off value corresponding to at least one transmit beam or reference signal resource, a power back-off value corresponding to at least one transmit beam group or reference signal resource group, a difference or ratio between power back-off values corresponding to at least one group of two transmit beams or reference signal resources, and a difference or ratio between power back-off values corresponding to at least one group of two transmit beam groups or reference signal resource groups.

In some implementations, the indication information of at least one transmit beam or reference signal resource may include, but is not limited to, at least one of the following: transmit beam indication of at least one transmit beam or reference signal resource indication of at least one reference signal resource, transmit beam group indication of at least one transmit beam group or reference signal resource group indication of at least one reference signal resource group, transmit beam indication of at least one group of two transmit beams or reference signal resource indication of at least one group of two reference signal resources, and transmit beam group indication of at least one group of two transmit beam groups or reference signal resource group indication of at least one group of two reference signal resource groups.

In some implementations, one transmit beam or reference signal resource may include, but is not limited to, one of the following: the transmit beam or reference signal resource currently working; the transmit beam or reference signal resource most recently working before a specified time, for example, before interval P, before P slots, or before P symbols; any one transmit beam or reference signal resource in a specified group of transmit beams or reference signal resources, where the specified group of transmit beams or reference signal resources may be specified in a protocol, determined by the terminal device, or indicated by the network device; and any one transmit beam or reference signal resource among all transmit beams or reference signal resources used for uplink transmission of the terminal device.

The transmit beam indication or the reference signal resource indication refers to identifier information indicative of the transmit beam or the reference signal resource, for example, identifier information of a signal or a signal resource.

The transmit beam group indication or the reference signal resource group indication refers to identifier information indicative of the transmit beam group or the reference signal resource group, for example, identifier information of a signal group or a signal resource group.

In some implementations, one transmit beam group or reference signal resource group may include, but is not limited to, one of the following: the transmit beam group to which a transmit beam currently working belongs or reference signal resource group to which a reference signal resource currently working belongs; the transmit beam group to which a transmit beam most recently working before a specified time belongs or reference signal resource group to which a reference signal resource most recently working before a specified time belongs, where "before the specified time" may be, for example, before interval P, before P slots, or before P symbols; and any one transmit beam group or reference signal resource group among all transmit beams or reference signal resources used for uplink transmission of the terminal device.

In some implementations, the two transmit beams or reference signal resources may include, but are not limited to, one of the following: any two transmit beams or reference signal resources among all transmit beams or reference signal resources used for uplink transmission of the terminal device; a transmit beam or reference signal resource currently working, and any one transmit beam or reference signal resource among all transmit beams or reference signal resources used for uplink transmission of the terminal device other than the transmit beam or reference signal resource currently working; and a transmit beam or reference signal resource most recently working before a specified time, and any one transmit beam or reference signal resource among all transmit beams or reference signal resources used for uplink transmission of the terminal device other than the transmit beam or reference signal resource most recently working before the specified time, for example, before interval P, before P slots, or before P symbols.

In some implementations, the two transmit beam groups or reference signal resource groups may include, but are not limited to, one of the following: any two transmit beam groups or reference signal resource groups among all transmit beams or reference signal resources used for uplink transmission of the terminal device; a transmit beam group to which a transmit beam currently working belongs or reference signal resource group to which a reference signal resource currently working belongs, and any one transmit beam group or reference signal resource group among all transmit beams or reference signal resources used for uplink transmission of the terminal device; a transmit beam group to which a transmit beam currently working belongs or reference signal resource group to which a reference signal resource currently working belongs, and any one transmit beam group or reference signal resource group among all transmit beams or reference signal resources used for uplink transmission of the terminal device other than the transmit beam group to which the transmit beam currently working belongs or reference signal resource group to which the reference signal resource currently working belongs; and a transmit beam group to which a transmit beam most recently working before a specified time belongs or reference signal resource group to which a reference signal resource most recently working before a specified time belongs, and any one transmit beam group or reference signal resource group among all transmit beams or reference signal resources used for uplink transmission of the terminal device other than the transmit beam group to which the transmit beam most recently working before the specified time belongs or reference signal resource group to which the reference signal resource most recently working before the specified time belongs, where "before the specified time" may be, for example, before interval P, before P slots, or before P symbols.

The power back-off value and the difference or ratio between power back-off values included in the power back-off information may be an actual numerical value, an actual numerical value of difference relative to a reference value, quantitative information of the above two types of actual numerical values, or grade information corresponding to the above two types of actual numerical values, or a bit(s) corresponding to each of the above two types of actual numerical values, for example, 1<x<2 corresponds to 001, and the disclosure is not limited in this regard.

In some implementations, the report indication can be used to indicate that the constraint on a power back-off value is satisfied.

As such, the terminal device will perform information reporting only when the constraint on a power back-off value is satisfied, which is possible to effectively reduce resource demand on an uplink channel, thereby saving uplink resources, and on the other hand, reduce uplink interference in a system.

In other implementations, the report indication can be used to indicate whether the constraint on a power back-off value is satisfied.

As such, a determination result on the constraint is directly reported to the network device, which is possible to simplify determination on the constraint performed by the terminal device, thereby reducing processing complexity of the terminal device.

In some implementations, at block 210, the terminal device can send, through a physical layer channel, to the network device the power back-off information corresponding to at least one transmit beam or reference signal resource.

By using the physical layer channel for information reporting, reporting delay will be low, and it is possible to quickly notify the network device, such that the network device can quickly obtain information and perform an operation or instruction in time, thereby realizing reliable uplink transmission of multiple transmit beams.

In some implementations, the physical layer channel may include, but is not limited to, at least one of a physical random access channel (PRACH) and a physical uplink control channel (PUCCH), which is not limited herein.

The terminal device can send, through the PRACH, to the network device the power back-off information corresponding to at least one transmit beam or reference signal resource, which is simple in design and standardization and may be implemented in the following manners.

Manner 1: the terminal device performs uplink transmission by using at least one of a specific PRACH time-frequency resource and a specific PRACH sequence parameter, to send to the network device the power back-off information corresponding to at least one transmit beam or reference signal resource. As such, the amount of information transmitted is small, which can effectively reduce system resource demand.

For example, the PRACH can transmit only one bit of information as the report indication which is used to indicate that the constraint on a power back-off value is satisfied, or indicate whether the constraint on a power back-off value is satisfied. Since the amount of information transmitted is small, system resource demand can be effectively reduced. For details of the constraint on a power back-off value, reference can be made to the related descriptions in the foregoing implementations.

The network device can configure the at least one of the specific PRACH time-frequency resource and the specific PRACH sequence parameter as the report indication. In this scenario, when the constraint on a power back-off value is satisfied, or according to the configuration information, the terminal device can transmit the uplink signal by using the at least one of the specific PRACH time-frequency resource and the specific PRACH sequence parameter.

Accordingly, when the constraint on a power back-off value is not satisfied, the terminal device will not perform transmitting the uplink signal by using the at least one of the specific PRACH time-frequency resource and the specific PRACH sequence parameter.

Upon receiving the uplink signal, the network device can determine whether to perform uplink beam management, according to indication of the uplink signal that the constraint on a power back-off value is satisfied or whether the constraint on a power back-off value is satisfied. Upon determining that the uplink beam management is required, the network device can configure or trigger the uplink beam management, for example, notify the terminal device to send an SRS which is used to measure channel quality corresponding to different transmit beams.

Manner 2: the terminal device performs uplink transmission of detailed reported information through the PRACH, to send to the network device the power back-off information corresponding to at least one transmit beam or reference signal resource. In this way, reported information will be flexible and varied, which is conducive to assisting the network device in determination and decision making, thereby improving uplink transmission and improving system performance.

For example, the terminal device can send, through the PRACH, to the network device the power back-off value corresponding to at least one transmit beam or reference signal resource.

For another example, the terminal device can send, through the PRACH, to the network device the power back-off value corresponding to at least one transmit beam or reference signal resource, and the transmit beam indication of at least one transmit beam or reference signal resource indication of at least one reference signal resource.

For another example, the terminal device can send, through the PRACH, to the network device the power back-off value corresponding to at least one transmit beam group or reference signal resource group.

For another example, the terminal device can send, through the PRACH, to the network device the power back-off value corresponding to at least one transmit beam group or reference signal resource group, and the transmit beam group indication of at least one transmit beam group or reference signal resource group indication of at least one reference signal resource group.

For another example, the terminal device can send, through the PRACH, to the network device the difference or ratio between power back-off values corresponding to at least one group of two transmit beams or reference signal resources.

For another example, the terminal device can send, through the PRACH, to the network device the difference or ratio between power back-off values corresponding to at least one group of two transmit beams or reference signal resources, and the transmit beam indication of at least one group of two transmit beams or reference signal resource indication of at least one group of two reference signal resources.

For another example, the terminal device can send, through the PRACH, to the network device the difference or ratio between power back-off values corresponding to at least one group of two transmit beam groups or reference signal resource groups.

For another example, the terminal device can send, through the PRACH, to the network device the difference or ratio between power back-off values corresponding to at least one group of two transmit beam groups or reference signal resource groups, and the transmit beam group indication of at least one group of two transmit beam groups or reference signal resource group indication of at least one group of two reference signal resource groups.

For details of the one transmit beam or reference signal resource, the one transmit beam group or reference signal resource group, the two transmit beams or reference signal resources, and the two transmit beam groups or reference signal resource groups, reference can be made to the related descriptions in the foregoing implementations.

According to implementations, the PRACH uplink transmission can be configured as content-free RACH.

Because a variety of information is reported to the network device, which may include, for example, transmit beam indication of multiple transmit beams or reference signal resource indication of multiple reference signal resources, and corresponding power back-off values, after receiving the detailed reported information, the network device can directly determine, from the transmit beam information or reference signal resource information reported by the terminal device, which uplink transmit beam to be used by the terminal device, and then notify the terminal device to use the selected transmit beam for uplink transmission.

Alternatively, the terminal device can send, through the PUCCH, to the network device the power back-off information corresponding to at least one transmit beam or reference signal resource, which may be implemented in the following manners.

Manner 1: the terminal device performs uplink transmission by using a specific PUCCH resource, to send to the network device the power back-off information corresponding to at least one transmit beam or reference signal resource. In this way, the amount of information transmitted is small, which can effectively reduce system resource demand.

For example, the PUCCH can transmit only one bit of information as the report indication which is used to indicate that the constraint on a power back-off value is satisfied, or indicate whether the constraint on a power back-off value is satisfied. Since the amount of information transmitted is small, system resource demand can be effectively reduced. For details of the constraint on a power back-off value, reference can be made to the related descriptions in the foregoing implementations.

The network device can configure the specific PUCCH resource as the report indication. In this scenario, when the constraint on a power back-off value is satisfied, or according to the configuration information, the terminal device can transmit an uplink signal by using the specific PUCCH resource.

Accordingly, when the constraint on a power back-off value is not satisfied, the terminal device will not perform transmitting the uplink signal by using the specific PUCCH resource.

Upon receiving the uplink signal, the network device can determine whether to perform uplink beam management, according to indication of the uplink signal that the constraint on a power back-off value is satisfied or whether the constraint on a power back-off value is satisfied. Upon determining that the uplink beam management is required, the network device can configure or trigger the uplink beam management, for example, notify the terminal device to send an SRS which is used to measure channel quality corresponding to different transmit beams.

Manner 2: the terminal device performs uplink transmission of detailed reported information through the PUCCH, to send to the network device the power back-off information corresponding to at least one transmit beam or reference signal resource. In this way, reported information will be flexible and varied, which is conducive to assisting the network device in determination and decision making, thereby improving uplink transmission and improving system performance.

For example, the terminal device can send, through the PUCCH, to the network device the power back-off value corresponding to at least one transmit beam or reference signal resource.

For another example, the terminal device can send, through the PUCCH, to the network device the power back-off value corresponding to at least one transmit beam or reference signal resource, and the transmit beam indication of at least one transmit beam or reference signal resource indication of at least one reference signal resource.

For another example, the terminal device can send, through the PUCCH, to the network device the power back-off value corresponding to at least one transmit beam group or reference signal resource group.

For another example, the terminal device can send, through the PUCCH, to the network device the power back-off value corresponding to at least one transmit beam group or reference signal resource group, and the transmit beam group indication of at least one transmit beam group or reference signal resource group indication of at least one reference signal resource group.

For another example, the terminal device can send, through the PUCCH, to the network device the difference or ratio between power back-off values corresponding to at least one group of two transmit beams or reference signal resources.

For another example, the terminal device can send, through the PUCCH, to the network device the difference or ratio between power back-off values corresponding to at least one group of two transmit beams or reference signal resources, and the transmit beam indication of at least one group of two transmit beams or reference signal resource indication of at least one group of two reference signal resources.

For another example, the terminal device can send, through the PUCCH, to the network device the difference or ratio between power back-off values corresponding to at least one group of two transmit beam groups or reference signal resource groups.

For another example, the terminal device can send, through the PUCCH, to the network device the difference or ratio between power back-off values corresponding to at least one group of two transmit beam groups or reference signal resource groups, and the transmit beam group indication of at least one group of two transmit beam groups or reference signal resource group indication of at least one group of two reference signal resource groups.

For details of the one transmit beam or reference signal resource, the one transmit beam group or reference signal resource group, the two transmit beams or reference signal resources, and the two transmit beam groups or reference signal resource groups, reference can be made to the related descriptions in the foregoing implementations.

Because a variety of information is reported to the network device, which may include, for example, transmit beam indication of multiple transmit beams or reference signal resource indication of multiple reference signal resources, and corresponding power back-off values, after receiving the detailed reported information, the network device can directly determine, from the transmit beam information or reference signal resource information reported by the terminal device, which uplink transmit beam to be used by the terminal device, and then notify the terminal device to use the selected transmit beam for uplink transmission.

In other implementations, at block 210, the terminal device can send, through higher-layer signaling, to the network device the power back-off information corresponding to at least one transmit beam or reference signal resource.

By using the higher-layer signaling for information reporting, simple signaling design can be achieved, which is possible to substantially simplify a physical-layer protocol procedure and operations implemented by the terminal device. In addition, the network device can quickly obtain information and perform an operation or instruction in time, thereby achieving reliable uplink transmission of multiple transmit beams.

In some implementations, the higher-layer signaling may include, but is not limited to, at least one of new MAC CE signaling and MAC CE signaling corresponding to the power status report, and the disclosure is not limited in this regard.

In some implementations, the MAC CE signaling corresponding to the power status report may include, but is not limited to, at least one of: a reserved bit in the MAC CE signaling corresponding to the power status report, an extended bit in the MAC CE signaling corresponding to the power status report, and bits of some other existing fields in the MAC CE signaling corresponding to the power status report.

In some implementations, the power status report may include, but is not limited to, the PHR, and the disclosure is not limited in this regard.

Dedicated MAC CE signaling can be designed for the power back-off information corresponding to at least one transmit beam or reference signal resource reported by the terminal device. In this way, by designing new MAC CE signaling, it is possible to avoid multiplexing with other existing MAC CE signaling and thus improve flexibility, thereby better matching this scenario or optimizing this scenario.

The new MAC CE signaling corresponds to a MAC subheader, where the MAC subheader has a field, that is, logical channel identity (LCD) field, which is indicative of information indicated by the dedicated MAC CE signaling. The new MAC CE signaling may transmit information in the following manners.

Manner 1: the new MAC CE signaling can transmit one piece of power back-off value information. As such, it is possible to reduce the number of transmitted bits and thus reduce system overhead.

For details of the power back-off value information, reference can be made to the related descriptions in the foregoing implementations.

FIG. 3A is a schematic diagram, where one row represents 8 bits, that is, one byte, and the same also applies to other figures and will not be repeated. There may be X reserved bit(s) (identified by R, and X=2 in FIG. 3A). The remaining (8-X-T) bit(s) are indicative of the power back-off value information. T≥0 because there may be bits for other uses, and the same also applies to the following implementations and will not be repeated for the sake of simplicity. X may be an integer ranging from 0~7.

FIG. 3B is a schematic diagram. There may be X reserved bit(s) in the beginning and Y reserved bit(s) in the end (identified by R, and X=2 and Y=1 in FIG. 3B). The remaining (8-X-Y-T) bit(s) are indicative of the power back-off value information. T≥0 because there may be bits for other uses, and the same also applies to the following implementations and will not be repeated for the sake of simplicity. X and Y may be integers ranging from 0~7 (the sum of X and Y is not greater than 8). If X=0, there is no reserved bit in the beginning. If Y=0, there is no reserved bit in the end.

Manner 2: the new MAC CE signaling can transmit a group of information which includes the indication information of at least one transmit beam or reference signal resource and corresponding power back-off value information (that is, power back-off value information corresponding to the at least one transmit beam or reference signal resource). Compared with manner 1, transmit beam indication information of at least one transmit beam or reference signal resource indication information of at least one reference signal resource is added, which is conducive to flexibility, for example, power back-off information corresponding to a specific transmit beam can be indicated.

For details of the indication information of at least one transmit beam or reference signal resource and the power back-off value information, reference can be made to the related descriptions in the foregoing implementations.

As an example, in the new MAC CE signaling, the indication information of at least one transmit beam or reference signal resource precedes the power back-off value information, and they each occupy one byte. As such, the indication information of at least one transmit beam or reference signal resource or the power back-off value information can be represented by a relatively large number of bits, which can increase a representation range and thus can be applied to systems of various configurations.

FIG. 3C is a schematic diagram. There may be X reserved bit(s) in the beginning and Y reserved bit(s) in the end (identified by R, and X=2 and Y=1 in FIG. 3C). The remaining (8-X-Y-T) bits are indicative of the power back-off value information and the indication information of at least one transmit beam or reference signal resource. The indication information of at least one transmit beam or reference signal resource may be an SRI, a CSI-RS resource indicator, or an SSB index, or may be a group of SRIs, a group of CSI-RS resource indicators, or a group of SSB indexes. X and Y may be integers ranging from 0~7 (the sum of X and Y is not greater than 8). If X=0, there is no reserved bit in the beginning. If Y=0, there is no reserved bit in the end. FIG. 3E is a special example (Y=0).

Figure 3D:
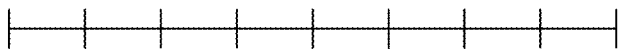
Figure 3E:
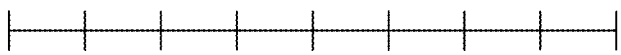
Figure 3F:
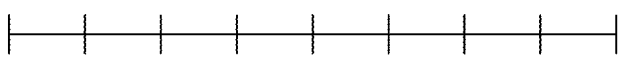
Figure 3G:
Figure 3H:
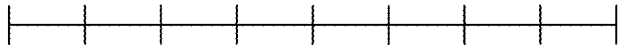
Figure 3I:
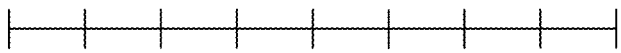
Figure 3J:
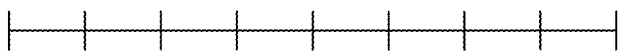

FIG. 3D is a schematic diagram. The difference between FIG. 3D and FIG. 3C lies in that while the two rows in FIG. 3C have the same number of reserved bits (that is, X and Y), the two rows in FIG. 3D have different numbers of reserved bits. For example, in FIG. 3D, a first row includes X and Y reserved bits (T further included), and a second row includes X' and Y' reserved bits (T' further included). FIG. 3F is a special example (Y=V'=0).

As another example, in the new MAC CE signaling, the power back-off value information precedes the indication information of at least one transmit beam or reference signal resource, and they each occupy one byte. As such, the indication information of at least one transmit beam or reference signal resource or the power back-off value information can be represented by a relatively large number of bits, which can increase a representation range and thus can be applied to systems of various configurations.

Compared with the previous example, the power back-off value information and the indication information of at least one transmit beam or reference signal resource in this example are contrary to those in the previous example in terms of position, and in terms of other aspects, the two examples are exactly the same. FIG. 3G~FIG. 3J correspond respectively to FIG. 3C~FIG. 3F.

As another example, in the new MAC CE signaling, the power back-off value information precedes the indication information of at least one transmit beam or reference signal resource, and they share one byte.

Figure 3K:
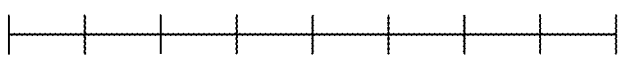

FIG. 3K is a schematic diagram. There may be X reserved bit(s) in the beginning and Y reserved bit(s) in the end (identified by R, and X=1 and Y=1 in FIG. 3K). Among the remaining bits, there are A bit(s) which are indicative of the power back-off value information and B bit(s) which are indicative of the indication information of at least one transmit beam or reference signal resource (A=3 and B=3 in FIG. 3K). X and Y may be integers ranging from 0~7 (the sum of X and Y is not greater than 8). A and B are integers greater than or equal to 1, where A+B+X+Y+T=8. If X=0, there is no reserved bit in the beginning. If Y=0, there is no reserved bit in the end.

As another example, in the new MAC CE signaling, the indication information of at least one transmit beam or reference signal resource precedes the power back-off value information, and they share one byte.

Compared with the previous example, the power back-off value information and the indication information of at least one transmit beam or reference signal resource in this example are contrary to those in the previous example in terms of position, and in terms of other aspects, the two examples are exactly the same.

Figure 3L:
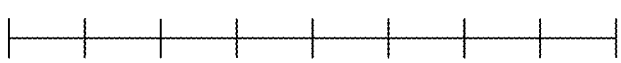

FIG. 3L is a schematic diagram. There may be X reserved bit(s) in the beginning and Y reserved bit(s) in the end (identified by R, and X=1 and Y=1 in FIG. 3L). Among the remaining bits, there are A bit(s) which are indicative of the power back-off value information and B bit(s) which are indicative of the indication information of at least one transmit beam or reference signal resource (A=3 and B=3 in FIG. 3L). X and Y may be integers ranging from 0~7 (the sum of X and Y is not greater than 8). A and B are integers greater than or equal to 1, where A+B+X+Y+T=8. If X=0, there is no reserved bit in the beginning. If Y=0, there is no reserved bit in the end.

Manner 3: based on manner 1, the new MAC CE signaling can transmit multiple pieces of power back-off value information.

In some implementations, an order of arrangement of the multiple pieces of power back-off value information can be determined according to the following options.

Option 1: the order of the multiple pieces of power back-off value information is determined, according to a position of reference signal resource information corresponding to each of the multiple pieces of power back-off value information (that is, reference signal resource information corresponding to each transmit beam) in RRC configuration signaling.

Option 2: the order of the multiple pieces of power back-off value information is determined, according to the magnitude of an identifier of a reference signal resource corresponding to each of the multiple pieces of power back-off value information. For example, the multiple pieces of power back-off value information may be arranged in a descending order (that is, from high to low) of the identifier of a reference signal resource. Alternatively, the multiple pieces of power back-off value information may be arranged in an ascending order (that is, from low to high) of the identifier of a reference signal resource.

Option 3: the order of the multiple pieces of power back-off value information is determined, according to a type of a reference signal resource corresponding to each of the multiple pieces of power back-off value information. For example, SSB>SRS>CSI-RS. Alternatively, SSB>CSI-RS>SRS. Alternatively, SRS>SSB>CSI-RS. Alternatively, SRS>CSI-RS>SSB. Alternatively, CSI-RS>SRS>SSB. Alternatively, CSI-RS>SSB>SRS.

Every two of or all of the three options option 1, option 2, and option 3 may be combined, to determine the order of the multiple pieces of power back-off value information. For example, option 3 is first adopted, and then for the same type of reference signal resource, option 1 and option 2 are adopted to further determine the order of the multiple pieces of power back-off value information.

Option 4: power back-off value information corresponding to a specific transmit beam or reference signal resource is arranged on the top or at the bottom (in case that different bytes are used) or arranged in the beginning or in the end (in case that one byte is used), and an order of other power back-off value information may be determined according to at least one of option 1, option 2, and option 3. For example, power back-off value information corresponding to the transmit beam or reference signal resource currently working is arranged on the top or at the bottom (or arranged in the beginning or in the end). For another example, power back-off value information corresponding to the transmit beam or reference signal resource most recently working before a specified time (for example, before interval P, before P slots, or before P symbols) is arranged on the top or at the bottom (or arranged in the beginning or in the end).

Occupancy of byte by the multiple pieces of power back-off value information can be designed in the following options.

Figure 3M:
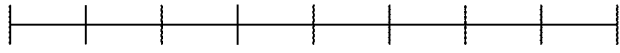

Option 1: the multiple pieces of power back-off value information each occupy one byte (some reserved bits may also be included). FIG. 3M illustrates a scenario in which two pieces of power back-off value information each occupy one byte.

Figure 3N:
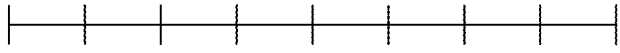
Figure 3O:
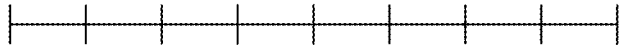

Option 2: the multiple pieces of power back-off value information share one byte (some reserved bits may also be included). FIG. 3N and FIG. 3O illustrate scenarios in which two pieces of power back-off value information share one byte.

In some implementations, the new MAC CE signaling may carry bit indication, which is indicative of whether there is a specific piece of power back-off value information.

Figure 3P:
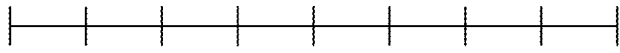
Figure 3Q:
Figure 3R:
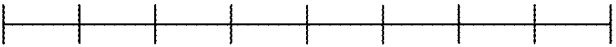
Figure 3S:
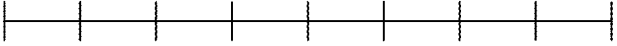

FIG. 3P is a schematic diagram. C0~C5 are indicative of whether corresponding power back-off value information is carried in the new MAC CE signaling. For example, 0 represents "carried", and 1 represents "not carried". Alternatively, 1 represents "carried", and 0 represents "not carried". C0, C1, C3, and C5 illustrated in FIG. 3P are set to be 1, to indicate that power back-off value information corresponding to each of a $0^{th}$ signal resource, a $1^{st}$ signal resource, a $3^{rd}$ signal resource, and a $5^{th}$ signal resource is carried. The value of each of C2 and C4 is 0. Alternatively, an order of C0~C5 illustrated in FIG. 3P may be reversed.

Manner 4: based on manner 2, the new MAC CE signaling may transmit multiple groups of information, that is, multiple pieces of indication information of at least one transmit beam or reference signal resource and corresponding power back-off value information.

FIG. 3Q~FIG. 3T illustrate scenarios of two groups of information, in which only special numbers of reserved bits in the beginning and/or in the end are illustrated.

Alternatively, MAC CE signaling corresponding to the PHR may be multiplexed or extended. In this way, there is no need to design new MAC CE signaling, which can reduce workload in standardization and reduce processing complexity of the terminal device and the network device.

The MAC CE signaling corresponding to the PHR currently has the following two formats.

Format 1: as illustrated in FIG. 3U, R represents the reserved bit. PH represents power headroom information. P_CMAX,f,c represents a maximum transmission power.

Format 2: as illustrated in FIG. 3V, R represents the reserved bit. PH represents power headroom information. P_CMAX,f,c represents a maximum transmission power. P is indicative of information related to power headroom calculation. V is indicative of information related to calculation of P_CMAX,f,c. C7~C1 each are used to indicate with 1 bit whether to report a power headroom and maximum transmission power of a corresponding cell, that is, whether the power headroom and maximum transmission power of the corresponding cell are carried in the signaling.

Format 1 can be achieved in the following manners.

Manner 1: one reserved bit in the MAC CE signaling corresponding to the PHR (which may be any one of the four reserved bits illustrated in FIG. 3U) is multiplexed to transmit the report indication, which is used to indicate that the constraint on a power back-off value is satisfied, or indicate whether the constraint on a power back-off value is satisfied. For details of the constraint on a power back-off value, reference can be made to the related descriptions in the foregoing implementations. By means of this manner, it is possible to save bits and thus reduce overhead.

FIG. 3W is a schematic diagram. X represents a reserved bit that is multiplexed (which is the first reserved bit in FIG. 3W). If the value of X is 0, it indicates that the constraint on a power back-off value is not satisfied. If the value of X is 1, it indicates that the constraint on a power back-off value is satisfied.

Manner 2: multiple reserved bits (for example, N reserved bits) in the MAC CE signaling corresponding to the PHR (which may be any N bits of the four reserved bits or consecutive N bits of the four reserved bits illustrated in FIG. 3U) are multiplexed to transmit the power back-off value information. In this way, it is possible to decrease the number of transmitted bits and reduce system overhead.

For details of the power back-off value information, reference can be made to the related descriptions in the foregoing implementations.

FIG. 3X is a schematic diagram. X represents a reserved bit that is multiplexed (the first two reserved bits illustrated in FIG. 3X), which is indicative of the power back-off value information.

Manner 3: multiple extended bits (for example, N extended bits) are added in the MAC CE signaling corresponding to the PHR, to transmit the power back-off value information, or transmit the indication information of at least one transmit beam or reference signal resource and the corresponding power back-off value information, which is conducive to flexibility and adds more types of reported information or more accurate reported information, thereby assisting the network device in decision making and thus improving performance.

FIG. 3Y is a schematic diagram. Multiple extended bits are added in the MAC CE signaling corresponding to the PHR, to indicate the power back-off value information. The number of reserved bits in the beginning and in the end in each byte may be the same as that of the existing MAC CE signaling corresponding to the PHR (in which there are 2 reserved bits in the beginning of a byte). The reserved bits may be used to indicate other information.

Figure 3T:
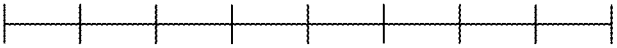

FIG. 3-2~FIG. 3T may be combined with FIG. 3U in the manner illustrated in FIG. 3Y, and the detailed schematic diagrams thereof will not be further provided.

Format 2 may be achieved in the following manners.

Manner 1: one reserved bit in the MAC CE signaling corresponding to the PHR (any one bit illustrated in FIG. 3V may be specified) is multiplexed to transmit the report indication, which is used to indicate that the constraint on a power back-off value is satisfied, or indicate whether the constraint on a power back-off value is satisfied. For details of the constraint on a power back-off value, reference can be made to the related descriptions in the foregoing implementations. By means of this manner, it is possible to save bits and thus reduce overhead.

FIG. 3Z is a schematic diagram. X represents a reserved bit that is multiplexed (which is the first reserved bit in FIG. 3Z). If the value of X is 0, it indicates that the constraint on a power back-off value is not satisfied. If the value of X is 1, it indicates that the constraint on a power back-off value is satisfied.

Manner 2: multiple reserved bits (for example, N reserved bits) in the MAC CE signaling corresponding to the PHR (which may be two reserved bits corresponding a P_CMAX, f,c row) are multiplexed to transmit the power back-off value information. In this way, it is possible to decrease the number of transmitted bits and reduce system overhead.

For details of the power back-off value information, reference can be made to the related descriptions in the foregoing implementations.

FIG. 3AA is a schematic diagram. X represents a reserved bit that is multiplexed (which is two reserved bits corresponding to the first P_CMAX,f,c row ($P\_{CMAX,f,c}$ 1) illustrated in FIG. 3AA), which is indicative of the power back-off value information.

Manner 3: multiple extended bits (for example, N extended bits) are added in the MAC CE signaling corresponding to the PHR, to transmit the power back-off value information, or transmit the indication information of at least one transmit beam or reference signal resource and the corresponding power back-off value information, which is conducive to flexibility and adds more types of reported information or more accurate reported information, thereby assisting the network device in decision making and thus improving performance.

FIG. 3AB is a schematic diagram. Multiple extended bits are added in the MAC CE signaling corresponding to the PHR, to indicate the power back-off value information. The number of reserved bits in the beginning and in the end in each byte may be the same as that of the existing MAC CE signaling corresponding to the PHR (in which there are 2 reserved bits in the beginning of a byte). The reserved bits may be used to indicate other information.

FIG. 3-2~FIG. 3T may be combined with FIG. 3V in the manner illustrated in FIG. 3AB, and the detailed schematic diagrams thereof will not be further provided.

Manner 4: some or all bits of a field corresponding to P_CMAX,f,c in the MAC CE signaling corresponding to the PHR is multiplexed.

According to implementations herein, the terminal device sends to the network device the power back-off information corresponding to at least one transmit beam or reference signal resource, such that the network device can quickly obtain information and perform an operation or instruction in time, thereby achieving reliable uplink transmission of multiple transmit beams.

In addition, by means of the technical solutions of implementations, it is possible to significantly improve user experience.

For the sake of simplicity, the foregoing method implementations are described as a series of action combinations. However, it will be appreciated by those skilled in the art that implementations are not limited by the sequence of actions described. According to implementations, some steps or operations may be performed in other orders or simultaneously. Besides, it will be appreciated by those skilled in the art that the implementations described in the specification are exemplary implementations, and the actions and modules involved are not necessarily essential to the disclosure.

In the foregoing implementations, the description of each implementation has its own emphasis. For the parts not described in detail in one implementation, reference may be made to related descriptions in other implementations.

Figure 4:
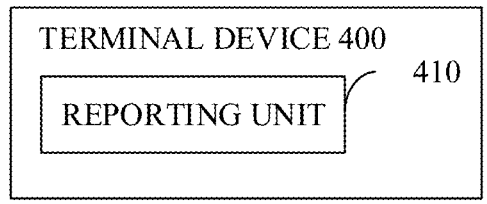
FIG. 4 is a schematic block diagram of a terminal device according to implementations.

FIG. 4 is a schematic block diagram of a terminal device 400 according to implementations. The terminal device 400 of implementations includes a reporting unit 410. The reporting unit 410 is configured to send to a network device power back-off information corresponding to at least one transmit beam or reference signal resource.

In some implementations, the transmit beam for the terminal device corresponds to at least one of an SRS/SRS resource, an SSB, and a CSI-RS/CSI-RS resource, which is not limited herein. Accordingly, the reference signal resource includes, but is not limited to, at least one of an SRS/SRS resource, an SSB, and a CSI-RS/CSI-RS resource, which is not limited herein.

In some implementations, the reporting unit 410 is configured to perform one of the following: the reporting unit 410 is configured to send to the network device the power back-off information corresponding to at least one transmit beam or reference signal resource, when a constraint on a power back-off value is satisfied; the reporting unit 410 is configured to send to the network device the power back-off information corresponding to at least one transmit beam or reference signal resource, when a report condition on a power status report is satisfied; and the reporting unit 410 is configured to send to the network device the power back-off information corresponding to at least one transmit beam or reference signal resource, according to configuration information.

In some implementations, the power status report includes, but is not limited to, a PHR, and the disclosure is not limited in this regard.

In some implementations, the constraint on a power back-off value includes, but is not limited to, at least one of the following: there is one transmit beam or reference signal resource or one transmit beam group or reference signal resource group which has a power back-off value greater than or equal to a first threshold value; and there are two transmit beams or reference signal resources or two transmit beam groups or reference signal resource groups which have a difference or ratio in power back-off values that is greater than or equal to a second threshold value.

The difference may refer to a difference between power back-off values in a dB domain. The ratio may refer to a ratio between linear power back-off values.

In addition, the difference refers to an absolute value.

In some implementations, the first threshold value is specified in a protocol, determined by the terminal device, or indicated by the network device, which is not limited herein.

In some implementations, the first threshold value is indicated by the network device. The reporting unit 410 is further configured to receive at least one of the following messages which are sent by the network device and indicative of the first threshold value: a system broadcast message, RRC signaling, MAC CE signaling, and DCI.

In some implementations, the second threshold value is specified in a protocol, determined by the terminal device, or indicated by the network device, which is not limited herein.

In some implementations, the second threshold value is indicated by the network device. The reporting unit 410 is further configured to receive at least one of the following messages which are sent by the network device and indicative of the second threshold value: a system broadcast message, RRC signaling, MAC CE signaling, and DCI.

In some implementations, the power back-off information corresponding to at least one transmit beam or reference signal resource may include, but is not limited to, at least one of: report indication, power back-off value information, and indication information of at least one transmit beam or reference signal resource.

In some implementations, the power back-off value information may include, but is not limited to, at least one of the following: a power back-off value corresponding to at least one transmit beam or reference signal resource, a power back-off value corresponding to at least one transmit beam group or reference signal resource group, a difference or ratio between power back-off values corresponding to at least one group of two transmit beams or reference signal resources, and a difference or ratio between power back-off values corresponding to at least one group of two transmit beam groups or reference signal resource groups.

In some implementations, the indication information of at least one transmit beam or reference signal resource may include, but is not limited to, at least one of the following: transmit beam indication of at least one transmit beam or reference signal resource indication of at least one reference signal resource; transmit beam group indication of at least one transmit beam group or reference signal resource group indication of at least one reference signal resource group; transmit beam indication of at least one group of two transmit beams or reference signal resource indication of at least one group of two reference signal resources; and transmit beam group indication of at least one group of two transmit beam groups or reference signal resource group indication of at least one group of two reference signal resource groups.

In some implementations, one transmit beam or reference signal resource may include, but is not limited to, one of the following: the transmit beam or reference signal resource currently working; the transmit beam or reference signal resource most recently working before a specified time, for example, before interval P, before P slots, or before P symbols; any one transmit beam or reference signal resource in a specified group of transmit beams or reference signal resources, where the specified group of transmit beams or reference signal resources may be specified in a protocol, determined by the terminal device, or indicated by the network device; and any one transmit beam or reference signal resource among all transmit beams or reference signal resources used for uplink transmission of the terminal device.

The transmit beam indication or the reference signal resource indication refers to identifier information indicative of the transmit beam or the reference signal resource, for example, identifier information of a signal or a signal resource.

The transmit beam group indication or the reference signal resource group indication refers to identifier information indicative of the transmit beam group or the reference signal resource group, for example, identifier information of a signal group or a signal resource group.

In some implementations, one transmit beam group or reference signal resource group may include, but is not limited to, one of the following: the transmit beam group to which a transmit beam currently working belongs or reference signal resource group to which a reference signal resource currently working belongs; the transmit beam group to which a transmit beam most recently working before a specified time belongs or reference signal resource group to which a reference signal resource most recently working before a specified time belongs, where "before the specified time" may be, for example, before interval P, before P slots, or before P symbols; and any one transmit beam group or reference signal resource group among all transmit beams or reference signal resources used for uplink transmission of the terminal device.

In some implementations, the two transmit beams or reference signal resources may include, but are not limited to, one of the following: any two transmit beams or reference signal resources among all transmit beams or reference signal resources used for uplink transmission of the terminal device; a transmit beam or reference signal resource currently working, and any one transmit beam or reference signal resource among all transmit beams or reference signal resources used for uplink transmission of the terminal device other than the transmit beam or reference signal resource currently working; and a transmit beam or reference signal resource most recently working before a specified time, and any one transmit beam or reference signal resource among all transmit beams or reference signal resources used for uplink transmission of the terminal device other than the transmit beam or reference signal resource most recently working before the specified time, for example, before interval P, before P slots, or before P symbols.

In some implementations, the two transmit beam groups or reference signal resource groups may include, but are not limited to, one of the following: any two transmit beam groups or reference signal resource groups among all transmit beams or reference signal resources used for uplink transmission of the terminal device; a transmit beam group to which a transmit beam currently working belongs or reference signal resource group to which a reference signal resource currently working belongs, and any one transmit beam group or reference signal resource group among all transmit beams or reference signal resources used for uplink transmission of the terminal device; a transmit beam group to which a transmit beam currently working belongs or reference signal resource group to which a reference signal resource currently working belongs, and any one transmit beam group or reference signal resource group among all transmit beams or reference signal resources used for uplink transmission of the terminal device other than the transmit beam group to which the transmit beam currently working belongs or reference signal resource group to which the reference signal resource currently working belongs; and a transmit beam group to which a transmit beam most recently working before a specified time belongs or reference signal resource group to which a reference signal resource most recently working before a specified time belongs, and any one transmit beam group or reference signal resource group among all transmit beams or reference signal resources used for uplink transmission of the terminal device other than the transmit beam group to which the transmit beam most recently working before the specified time belongs or reference signal resource group to which the reference signal resource most recently working before the specified time belongs, where "before the specified time" may be, for example, before interval P, before P slots, or before P symbols.

The power back-off value and the difference or ratio between power back-off values included in the power back-off information may be an actual numerical value, an actual numerical value of difference relative to a reference value, quantitative information of the above two types of actual numerical values, or grade information corresponding to the above two types of actual numerical values, or a bit(s) corresponding to each of the above two types of actual numerical values, for example, $1<x<2$ corresponds to 001, and the disclosure is not limited in this regard.

In some implementations, the report indication can be used to indicate that the constraint on a power back-off value is satisfied.

As such, the terminal device will perform information reporting only when the constraint on a power back-off value is satisfied, which is possible to effectively reduce resource demand on an uplink channel, thereby saving uplink resources, and on the other hand, reduce uplink interference in a system.

In other implementations, the report indication can be used to indicate whether the constraint on a power back-off value is satisfied.

As such, a determination result on the constraint is directly reported to the network device, which is possible to simplify determination on the constraint performed by the terminal device, thereby reducing processing complexity of the terminal device.

In some implementations, the reporting unit 410 is configured to perform one of the following: the reporting unit 410 is configured to send to the network device the power back-off information corresponding to at least one transmit beam or reference signal resource, through a physical layer channel; and the reporting unit 410 is configured to send to the network device the power back-off information corresponding to at least one transmit beam or reference signal resource, through higher-layer signaling.

In some implementations, the physical layer channel may include, but is not limited to, at least one of a PRACH and a PUCCH, which is not limited herein.

The reporting unit 410 can send, through the PRACH, to the network device the power back-off information corresponding to at least one transmit beam or reference signal resource, which is simple in design and standardization and may be implemented in the following manners.

Manner 1: the reporting unit 410 is configured to perform uplink transmission by using at least one of a specific PRACH time-frequency resource and a specific PRACH sequence parameter, to send to the network device the power back-off information corresponding to at least one transmit beam or reference signal resource.

Manner 2: the reporting unit 410 is configured to perform uplink transmission of detailed reported information through the PRACH, to send to the network device the power back-off information corresponding to at least one transmit beam or reference signal resource.

Alternatively, the reporting unit 410 can send, through the PUCCH, to the network device the power back-off information corresponding to at least one transmit beam or reference signal resource, which may be implemented in the following manners.

Manner 1: the reporting unit 410 is configured to perform uplink transmission by using a specific PUCCH resource, to send to the network device the power back-off information corresponding to at least one transmit beam or reference signal resource.

Manner 2: the terminal device performs uplink transmission of detailed reported information through the PUCCH, to send to the network device the power back-off information corresponding to at least one transmit beam or reference signal resource.

In some implementations, the higher-layer signaling may include, but is not limited to, at least one of new MAC CE signaling and MAC CE signaling corresponding to the power status report, and the disclosure is not limited in this regard.

In some implementations, the MAC CE signaling corresponding to the power status report may include, but is not limited to, at least one of: a reserved bit in the MAC CE signaling corresponding to the power status report, an extended bit in the MAC CE signaling corresponding to the power status report, and bits of some other existing fields in the MAC CE signaling corresponding to the power status report.

In some implementations, the power status report may include, but is not limited to, the PHR, and the disclosure is not limited in this regard.

Dedicated MAC CE signaling can be designed for the power back-off information corresponding to at least one transmit beam or reference signal resource reported by the terminal device. In this way, by designing new MAC CE signaling, it is possible to avoid multiplexing with other existing MAC CE signaling and thus improve flexibility, thereby better matching this scenario or optimizing this scenario.

The new MAC CE signaling corresponds to a MAC subheader, where the MAC subheader has a field, that is, logical channel identity (LCD) field, which is indicative of information indicated by the dedicated MAC CE signaling. The new MAC CE signaling may transmit information in the following manners.

Manner 1: the new MAC CE signaling can transmit one piece of power back-off value information. As such, it is possible to reduce the number of transmitted bits and thus reduce system overhead.

Manner 2: the new MAC CE signaling can transmit a group of information which includes the indication information of at least one transmit beam or reference signal resource and corresponding power back-off value information.

In some implementations, the indication information of at least one transmit beam or reference signal resource and the power back-off value information each occupy one byte. Alternatively, the indication information of at least one transmit beam or reference signal resource and the power back-off value information share one byte.

In some implementations, the indication information of at least one transmit beam or reference signal resource precedes the power back-off value information. Alternatively, the indication information of at least one transmit beam or reference signal resource is subsequent to the power back-off value information.

Manner 3: based on manner 1, the new MAC CE signaling can transmit multiple pieces of power back-off value information.

In some implementations, the reporting unit 410 is further configured to determine an order of arrangement of the multiple pieces of power back-off value information, according to at least one of: a position of reference signal resource information corresponding to each of the multiple pieces of power back-off value information in RRC configuration signaling, an identifier of a reference signal resource corresponding to each of the multiple pieces of power back-off value information, a type of a reference signal resource corresponding to each of the multiple pieces of power back-off value information, and power back-off value information corresponding to a specific transmit beam or reference signal resource.

In some implementations, the new MAC CE signaling may carry bit indication, which is indicative of whether there is a specific piece of power back-off value information.

Manner 4: based on manner 2, the new MAC CE signaling may transmit multiple groups of information, that is, multiple pieces of indication information of at least one transmit beam or reference signal resource and corresponding power back-off value information.

Alternatively, MAC CE signaling corresponding to the PHR may be multiplexed or extended, which may be implemented in the following manners.

Manner 1: a reserved bit in the MAC CE signaling corresponding to the power status report is used for transmitting the report indication, which is used to indicate that the constraint on a power back-off value is satisfied, or indicate whether the constraint on a power back-off value is satisfied.

Manner 2: a reserved bit in the MAC CE signaling corresponding to the power status report is used for transmitting the power back-off value information.

Manner 3: an extended bit in the MAC CE signaling corresponding to the power status report is used for transmitting the power back-off value information, or transmitting the indication information of at least one transmit beam or reference signal resource and the corresponding power back-off value information.

Manner 4: some or all bits of a field corresponding to P_CMAX,f,c in MAC CE signaling corresponding to the PHR is multiplexed.

The method performed by the terminal device in implementations illustrated in FIG. 2 can be used to implement corresponding functions implemented by the terminal device in the foregoing implementations. For details thereof, reference can be made to related descriptions in the implementations illustrated in FIG. 2, which will not be repeated herein.

According to implementations herein, the reporting unit sends to the network device the power back-off information corresponding to at least one transmit beam or reference signal resource, such that the network device can quickly obtain information and perform an operation or instruction in time, thereby achieving reliable uplink transmission of multiple transmit beams.

In addition, by means of the technical solutions of implementations, it is possible to significantly improve user experience.

Figure 5:
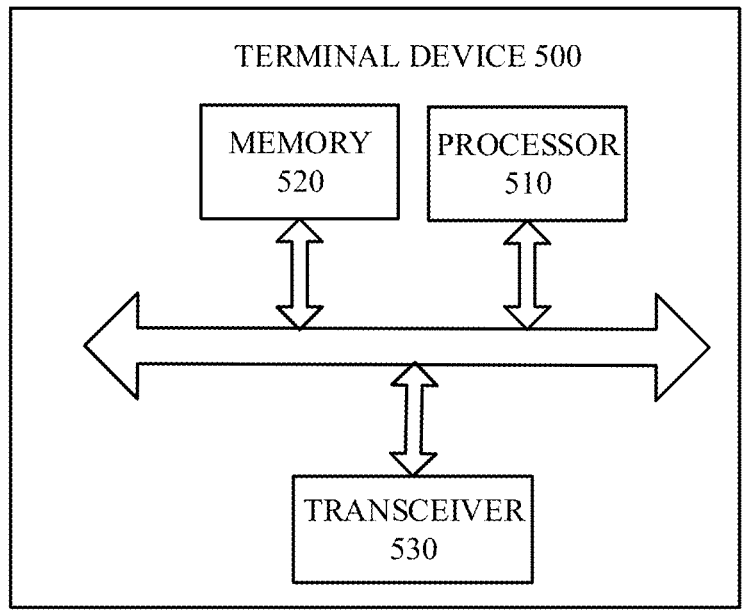
FIG. 5 is a schematic block diagram of a terminal device according to other implementations.

FIG. 5 is a schematic structural diagram of a terminal device 500 according to other implementations. As illustrated in FIG. 5, the terminal device 500 includes a processor 510. The processor 510 can invoke and execute computer programs stored in a memory to perform the method provided in implementations.

As illustrated in FIG. 5, the terminal device 500 can further include the memory 520. The processor 510 can invoke and execute the computer programs stored in the memory 520 to perform the method provided in implementations.

The memory 520 may be a separate device independent of the processor 510, or may be integrated into the processor 510.

It should be understood that, the processor referred to herein may be an integrated circuit chip with signal processing capabilities. During implementation, each step of the foregoing method may be completed by an integrated logic circuit in the form of hardware or an instruction in the form of software in the processor. The processor may be a general-purpose processor, a digital signal processor (DSP), an application specific integrated circuit (ASIC), a field programmable gate array (FPGA), or other programmable logic devices, discrete gates or transistor logic devices, or discrete hardware components, which can implement or execute the methods, steps, and logic blocks disclosed in implementations. The general purpose processor may be a microprocessor, or the processor may be any conventional processor or the like. The steps of the method disclosed in implementations may be implemented through a hardware decoding processor, or may be performed by hardware and software modules in the decoding processor. The software module can be located in a storage medium such as a random access memory (RAM), a flash memory, a read only memory (ROM), a programmable ROM (PROM), or an electrically erasable programmable memory, registers, and the like. The storage medium is located in the memory. The processor reads the information in the memory, and completes the steps of the method described above with the hardware of the processor.

It can be understood that, the memory according to implementations may be a volatile memory or a non-volatile memory, or may include both the volatile memory and the non-volatile memory. The non-volatile memory may be a ROM, a PROM, an erasable programmable read only memory (erasable PROM, EPROM), an electrically erasable programmable read only memory (electrically EPROM, EEPROM), or flash memory. The volatile memory can be a RAM that acts as an external cache. By way of example but not limitation, many forms of RAM are available, such as a static random access memory (static RAM, SRAM), a dynamic random access memory (dynamic RAM, DRAM), a synchronous dynamic random access memory (synchronous DRAM, SDRAM), a double data rate SDRAM (DDR SDRAM), an enhanced SDRAM (ESDRAM), a synchronous link dynamic random access memory (synch-link DRAM, SLDRAM), and a direct rambus random access memory (direct rambus RAM, DR RAM). The memory of the systems and methods described herein is intended to include, but is not limited to, these and any other suitable types of memory.

It should be understood that, the above description of the memory is intended for illustration rather than limitation. For example, the memory of implementations may also be an SRAM, a DRAM, an SDRAM, a DDR SDRAM, an ESDRAM, an SLDRAM, a DR RAM, etc. In other words, the memory of implementations is intended to include, but is not limited to, these and any other suitable types of memory.

As illustrated in FIG. 5, the terminal device 500 can further include a transceiver 530. The processor 510 can control the transceiver 530 to communicate with other devices, for example, to send information or data to other devices, or to receive information or data from other devices.

The transceiver 530 may include a transmitter and a receiver. The transceiver 530 may further include an antenna, where one or more antenna can be provided.

The terminal device 500 may be operable as the terminal device of implementations, and the terminal device 500 can implement the operations performed by the terminal device described in the foregoing method implementations, which will not be repeated herein for the sake of simplicity.

Figure 6:
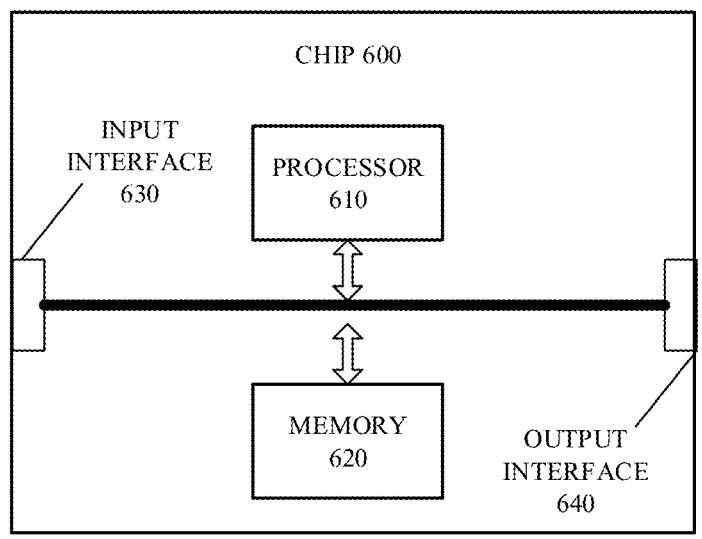
FIG. 6 is a schematic block diagram of a chip according to implementations.

FIG. 6 is a schematic block diagram of a chip 600 according to implementations. As illustrated in FIG. 6, the chip 600 includes a processor 610. The processor 610 is configured to invoke and execute computer programs stored in a memory to perform the method provided in implementations.

As illustrated in FIG. 6, the chip 600 further includes the memory 620. The processor 610 can invoke and execute the computer programs stored in the memory 620 to perform the method provided in implementations.

The memory 620 may be a separate device independent of the processor 610, or may be integrated into the processor 610.

It should be understood that, the processor referred to herein may be an integrated circuit chip with signal processing capabilities. During implementation, each step of the foregoing method may be completed by an integrated logic circuit in the form of hardware or an instruction in the form of software in the processor. The processor may be a general-purpose processor, a DSP, an ASIC, an FPGA, or other programmable logic devices, discrete gates or transistor logic devices, or discrete hardware components, which can implement or execute the methods, steps, and logic blocks disclosed in implementations. The general purpose processor may be a microprocessor, or the processor may be any conventional processor or the like. The steps of the method disclosed in implementations may be implemented through a hardware decoding processor, or may be performed by hardware and software modules in the decoding processor. The software module can be located in a storage medium such as a RAM, a flash memory, a ROM, a PROM, or an electrically erasable programmable memory, registers, and the like. The storage medium is located in the memory. The processor reads the information in the memory, and completes the steps of the method described above with the hardware of the processor.

It can be understood that, the memory according to implementations may be a volatile memory or a non-volatile memory, or may include both the volatile memory and the non-volatile memory. The non-volatile memory may be a ROM, a PROM, an EPROM, an EEPROM, or flash memory. The volatile memory can be a RAM that acts as an external cache. By way of example but not limitation, many forms of RAM are available, such as an SRAM, a DRAM, an SDRAM, a DDR SDRAM, an ESDRAM, a SLDRAM, and a DR RAM. The memory of the systems and methods described herein is intended to include, but is not limited to, these and any other suitable types of memory.

It should be understood that, the above description of the memory is intended for illustration rather than limitation. For example, the memory of implementations may also be an SRAM, a DRAM, an SDRAM, a DDR SDRAM, an ESDRAM, an SLDRAM, a DR RAM, etc. In other words, the memory of implementations is intended to include, but is not limited to, these and any other suitable types of memory.

The chip 600 may further include an input interface 630. The processor 610 can control the input interface 630 to communicate with other devices or chips, for example, to acquire information or data sent by other devices or chips.

The chip 600 may further include an output interface 640. The processor 610 can control the output interface 640 to communicate with other devices or chips, for example, to output information or data to other devices or chips.

The chip is applicable to the network device of implementations, and the chip can implement the operations performed by the network device described in the foregoing method implementations, which will not be repeated herein for the sake of simplicity.

Alternatively, the chip is applicable to the mobile terminal/terminal device of implementations, and the chip can implement the operations performed by the mobile terminal/terminal device described in the foregoing method implementations, which will not be repeated herein for the sake of simplicity.

It should be understood that, the chip herein may also be referred to as a system-on-chip (SOC).

Implementations further provide a computer readable storage medium. The computer readable storage medium is configured to store computer programs. The computer readable storage medium is applicable to the terminal device of implementations. The computer programs, when executed, are operable with a computer to implement the operations performed by the terminal device described in the foregoing method implementations, which will not be repeated herein for the sake of simplicity.

Implementations further provide a computer program product. The computer program product includes computer program instructions. The computer program product is applicable to the terminal device of implementations. The computer program instructions, when executed, are operable with a computer to implement the operations performed by the terminal device described in the foregoing method implementations, which will not be repeated herein for the sake of simplicity.

Implementations further provide a computer program. The computer program is applicable to the network device of implementations. The computer program is applicable to the terminal device of implementations. The computer program, when executed by a computer, is operable with the computer to implement the operations performed by the terminal device described in the foregoing method implementations, which will not be repeated herein for the sake of simplicity.

Those of ordinary skill in the art will appreciate that units and algorithmic operations of various examples described in connection with implementations herein can be implemented by electronic hardware or by a combination of computer software and electronic hardware. Whether these functions are performed by means of hardware or software depends on the application and the design constraints of the associated technical solution. Those skilled in the art may use different methods with regard to each particular application to implement the described functionality, but such methods should not be regarded as lying beyond the scope of the disclosure.

It will be evident to those skilled in the art that, for the sake of convenience and simplicity, in terms of the working processes of the foregoing systems, apparatuses, and units, reference can be made to the corresponding processes of the above method implementations, which will not be repeated herein.

It will be appreciated that the systems, apparatuses, and methods disclosed in implementations herein may also be implemented in various other manners. For example, the above apparatus implementations are merely illustrative, e.g., the division of units is only a division of logical functions, and there may exist other manners of division in practice, e.g., multiple units or assemblies may be combined or may be integrated into another system, or some features may be ignored or skipped. In other respects, the coupling or direct coupling or communication connection as illustrated or discussed may be an indirect coupling or communication connection through some interface, device or unit, and may be electrical, mechanical, or otherwise.

Separated units as illustrated may or may not be physically separated. Components displayed as units may or may not be physical units, and may reside at one location or may be distributed to multiple networked units. Some or all of the units may be selectively adopted according to practical needs to achieve desired objectives of the disclosure.

Various functional units described in implementations herein may be integrated into one processing unit or may be present as a number of physically separated units, and two or more units may be integrated into one.

If the integrated units are implemented as software functional units and sold or used as standalone products, they may be stored in a computer readable storage medium. Based on such an understanding, the essential technical solution, or the portion that contributes to the prior art, or part of the technical solution of the disclosure may be embodied as software products. The computer software products can be stored in a storage medium and may include multiple instructions that, when executed, can cause a computing device, e.g., a personal computer, a server, a network device, etc., to execute some or all operations of the methods described in various implementations. The above storage medium may include various kinds of media that can store program codes, such as a universal serial bus (USB) flash disk, a mobile hard drive, a ROM, a RAM, a magnetic disk, or an optical disk.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method for information processing, comprising:
   sending, by a terminal device, to a network device power back-off information corresponding to at least one reference signal resource through higher-layer signaling, when a constraint on a power back-off value is satisfied;
   wherein the power back-off information corresponding to the at least one reference signal resource comprises: power back-off value information and indication information of the at least one reference signal resource;
   wherein the constraint on a power back-off value comprises at least one of:
     there is one reference signal resource or reference signal resource group which has a power back-off value greater than or equal to a first threshold value; and
     there are two reference signal resources or reference signal resource groups which have a difference or ratio in power back-off values that is greater than or equal to a second threshold value; and
   wherein the reference signal resource comprises at least one of: a sounding reference signal (SRS), an SRS resource, a synchronization signal block (SSB), a channel state information reference signal (CSI-RS), and a CSI-RS resource.

2. The method of claim 1, wherein the power back-off value information comprises at least one of:
- a power back-off value corresponding to the at least one or reference signal resource;
- a power back-off value corresponding to at least one reference signal resource group;
- a difference or ratio between power back-off values corresponding to at least one group of two reference signal resources; and
- a difference or ratio between power back-off values corresponding to at least one group of two reference signal resource groups.

3. The method of claim 1, wherein the first threshold value is specified in a protocol, determined by the terminal device, or indicated by the network device.

4. The method of claim 3, further comprising:
receiving, by the terminal device, at least one of the following messages which are sent by the network device and indicative of the first threshold value:
- a system broadcast message;
- radio resource control (RRC) signaling;
- media access control (MAC) control element (CE) signaling; and
- downlink control information (DCI).

5. The method of claim 1, wherein one reference signal resource comprises one of:
- a reference signal resource currently working;
- a reference signal resource most recently working before a specified time;
- any one reference signal resource in a specified group of reference signal resources; and
- any one reference signal resource among all reference signal resources used for uplink transmission of the terminal device.

6. The method of claim 1, wherein the method further comprises:
sending, by the terminal device, to the network device the power back-off information corresponding to at least one reference signal resource, through a physical layer channel.

7. The method of claim 1, wherein the higher-layer signaling comprises at least one of new MAC CE signaling and MAC CE signaling corresponding to a power status report, wherein the MAC CE signaling corresponding to the power status report comprises at least one of the following, which is indicative of the power back-off information corresponding to the at least one reference signal resource:
- a reserved bit in the MAC CE signaling corresponding to the power status report;
- an extended bit in the MAC CE signaling corresponding to the power status report; and
- bits of some other existing fields in the MAC CE signaling corresponding to the power status report.

8. The method of claim 7, wherein the power status report comprises a power headroom report (PHR).

9. The method of claim 7, wherein at least one of the following is adopted:
- the new MAC CE signaling is used for transmitting at least one piece of power back-off value information, and
- the new MAC CE signaling carries a bit indication which is indicative of whether there is power back-off value information.

10. A terminal device, comprising:
at least one processor;
a transceiver; and
a memory storing instructions which, when executed by the at least one processor, cause the transceiver to:
send to a network device power back-off information corresponding to at least one reference signal resource through higher-layer signaling, when a constraint on a power back-off value is satisfied;
wherein the power back-off information corresponding to the at least one reference signal resource comprises: power back-off value information and indication information of the at least one reference signal resource;
wherein the constraint on a power back-off value comprises at least one of:
- there is one reference signal resource or reference signal resource group which has a power back-off value greater than or equal to a first threshold value; and
- there are two reference signal resources or reference signal resource groups which have a difference or ratio in power back-off values that is greater than or equal to a second threshold value; and
wherein the reference signal resource comprises at least one of: a sounding reference signal (SRS), an SRS resource, a synchronization signal block (SSB), a channel state information reference signal (CSI-RS), and a CSI-RS resource.

11. The terminal device of claim 10, wherein one reference signal resource group comprises one of:
- a reference signal resource group to which a reference signal resource currently working belongs;
- a reference signal resource group to which a reference signal resource most recently working before a specified time belongs; and
- any reference signal resource group among all reference signal resources used for uplink transmission of the terminal device.

12. The terminal device of claim 10, wherein the two reference signal resources comprise one of:
- any two reference signal resources among all reference signal resources used for uplink transmission of the terminal device;
- a reference signal resource currently working, and any one reference signal resource among all reference signal resources used for uplink transmission performed of the terminal device other than the reference signal resource currently working; and
- a reference signal resource most recently working before a specified time, and any one reference signal resource among all reference signal resources used for uplink transmission of the terminal device other than the reference signal resource most recently working before the specified time.

13. The terminal device of claim 10, wherein the two transmit beam groups or reference signal resource groups comprise one of:
- any two reference signal resource groups among all reference signal resources used for uplink transmission of the terminal device;
- a reference signal resource group to which a reference signal resource currently working belongs, and any reference signal resource group among all reference signal resources used for uplink transmission of the terminal device;
- a reference signal resource group to which a reference signal resource currently working belongs, and any reference signal resource group among all reference signal resources used for uplink transmission of the terminal device other than the reference signal resource group to which the reference signal resource currently working belongs; and a reference signal resource group to which a reference signal resource most recently working before a specified time belongs, and any reference signal resource group among all reference signal resources used for uplink transmission of the terminal device other than the reference signal resource group to which the reference signal resource most recently working before the specified time belongs.

14. The terminal device of claim 10, wherein the transceiver is configured to:
perform uplink transmission by using at least one of a specific PRACH time-frequency resource and a specific PRACH sequence parameter, or perform uplink transmission by using a specific PUCCH resource, to send to the network device the power back-off information corresponding to at least one reference signal resource.

15. The terminal device of claim 10,
wherein the higher-layer signaling comprises at least one of new MAC CE signaling and MAC CE signaling corresponding to a power status report;
wherein the at least one processor is configured to:
determine an order of arrangement of multiple pieces of power back-off value information, according to at least one of:
a position of reference signal resource information corresponding to each of the multiple pieces of power back-off value information in RRC configuration signaling;
an identifier of a reference signal resource corresponding to each of the multiple pieces of power back-off value information;
a type of a reference signal resource corresponding to each of the multiple pieces of power back-off value information; and
power back-off value information corresponding to a specific reference signal resource.

16. The terminal device of claim 15, wherein the new MAC CE signaling is used for transmitting at least one group of information which comprises indication information of the at least one reference signal resource and corresponding power back-off value information, and the new MAC CE signaling carries a bit indication which is indicative of whether there is power back-off value information, wherein:
one of the following is adopted: the indication information of the at least one reference signal resource and the power back-off value information each occupy one byte; and the indication information of the at least one reference signal resource and the power back-off value information share one byte; and
one of the following is adopted: the indication information of the at least one reference signal resource precedes the power back-off value information; and the indication information of the at least one reference signal resource is subsequent to the power back-off value information.

17. The terminal device of claim 10, wherein a reserved bit of an MAC CE signaling corresponding to a power status report is used for transmitting a report indication, which is used to indicate that the constraint on a power back-off value is satisfied or indicate whether the constraint on a power back-off value is satisfied.

* * * * *